United States Patent
Hopkins

(10) Patent No.: US 9,922,330 B2
(45) Date of Patent: Mar. 20, 2018

(54) SYSTEM AND METHOD FOR ADVERTISING ON A PEER-TO-PEER NETWORK

(75) Inventor: Samuel P. Hopkins, Freedom, PA (US)

(73) Assignee: Kroll Information Assurance, LLC, New York, NY (US)

( * ) Notice: Subject to any disclaimer, the term of this patent is extended or adjusted under 35 U.S.C. 154(b) by 2020 days.

(21) Appl. No.: 12/157,598

(22) Filed: Jun. 11, 2008

(65) Prior Publication Data

US 2008/0319861 A1 Dec. 25, 2008

Related U.S. Application Data

(63) Continuation of application No. 12/082,407, filed on Apr. 10, 2008, and application No. 60/923,042, Apr. 12, 2007.

(Continued)

(51) Int. Cl.
*G06Q 30/00* (2012.01)
*G06Q 30/02* (2012.01)
*G06Q 40/00* (2012.01)

(52) U.S. Cl.
CPC ......... *G06Q 30/02* (2013.01); *G06Q 30/0256* (2013.01); *G06Q 30/0277* (2013.01)

(58) Field of Classification Search
CPC ................................................ G06Q 30/0277
(Continued)

(56) References Cited

U.S. PATENT DOCUMENTS 111,604 A 2/1871 Bailey
5,233,604 A 8/1993 Ahmadi et al.
(Continued)

FOREIGN PATENT DOCUMENTS

EP 1107512 A1 6/2001
EP 1 367 518 A1 12/2003
(Continued)

OTHER PUBLICATIONS

Findeli, M., "Peer-to-Peer (P2P) Networking," pp. 1-21, On Line, Jul. 1-21, 2001.
(Continued)

*Primary Examiner* — Ojo O Oyebisi
(74) *Attorney, Agent, or Firm* — Arnold & Porter Kaye Scholer LLP

(57) ABSTRACT

A system for advertising on a Peer-to-Peer network detects a search request of a node in a Peer-to-Peer network. After detecting a search request, the system prepares an unsolicited response (e.g., advertisement) to the search request of the node. Once the unsolicited response is prepared, the system sends the unsolicited response to the node. For example, a Peer-to-Peer network node issues a search request and a system prepares an advertisement (e.g., an unsolicited response). After preparing the advertisement, the system sends the advertisement to the Peer-to-Peer network node that issued the search request. The process of sending advertisements can be made to each node issuing a search request without discrimination. In one example, the system detects a search request of a node in a Peer-to-Peer network; prepares an advertisement in response to the search request of the node based on a predetermined search criteria; and sends the advertisement to the node for advertising on the Peer-to-Peer network.

18 Claims, 14 Drawing Sheets

Related U.S. Application Data

(60) Provisional application No. 60/934,150, filed on Jun. 11, 2007.

(58) Field of Classification Search
USPC .................................. 705/14, 35, 25, 14.1
See application file for complete search history.

(56) References Cited

U.S. PATENT DOCUMENTS

| | | |
|---|---|---|
| 5,600,638 A | 2/1997 | Bertin et al. |
| 5,794,254 A | 8/1998 | McClain |
| 5,949,760 A | 9/1999 | Stevens et al. |
| 5,987,011 A | 11/1999 | Toh |
| 6,069,896 A | 5/2000 | Borgstahl et al. |
| 6,076,088 A | 6/2000 | Paik et al. |
| 6,147,971 A | 11/2000 | Rochberger et al. |
| 6,205,146 B1 | 3/2001 | Rochberger et al. |
| 6,397,246 B1 | 5/2002 | Wolfe |
| 6,483,808 B1 | 11/2002 | Rochberger et al. |
| 6,611,196 B2 | 8/2003 | Mynatt et al. |
| 6,668,289 B2 | 12/2003 | Cheng et al. |
| 6,732,180 B1 | 5/2004 | Hale et al. |
| 6,742,023 B1 | 5/2004 | Fanning et al. |
| 6,839,769 B2 | 1/2005 | Needham et al. |
| 6,855,660 B2 | 2/2005 | Tsou et al. |
| 6,918,113 B2 | 7/2005 | Patel et al. |
| 6,950,821 B2 | 9/2005 | Faybishenko et al. |
| 6,965,591 B1 | 11/2005 | Roy |
| 6,983,320 B1 | 1/2006 | Thomas et al. |
| 7,003,514 B2 | 2/2006 | Dutta et al. |
| 7,010,534 B2 | 3/2006 | Kraft |
| 7,027,994 B2 | 4/2006 | Verdi et al. |
| 7,035,653 B2 | 4/2006 | Simon et al. |
| 7,051,102 B2 | 5/2006 | Gupta et al. |
| 7,089,301 B1 | 8/2006 | Labio et al. |
| 7,120,145 B2 | 10/2006 | Ohba et al. |
| 7,120,619 B2 | 10/2006 | Drucker et al. |
| 7,174,382 B2 | 2/2007 | Ramanathan et al. |
| 7,177,295 B1 | 2/2007 | Sholander et al. |
| 7,206,841 B2 | 4/2007 | Traversat et al. |
| 7,277,946 B2 | 10/2007 | Humphrey et al. |
| 7,308,445 B2 | 12/2007 | Bharat et al. |
| 7,318,092 B2 | 1/2008 | Sutler |
| 7,327,683 B2 | 2/2008 | Ogier et al. |
| 7,418,455 B2 | 6/2008 | Fan et al. |
| 7,441,180 B1 | 10/2008 | Kaczmarek et al. |
| 7,493,363 B2 | 2/2009 | Huitema et al. |
| 7,574,523 B2 | 8/2009 | Traversat et al. |
| 7,583,682 B2 | 9/2009 | Hopkins |
| 7,600,033 B2 | 10/2009 | Bauer et al. |
| 7,703,040 B2 | 4/2010 | Cutrell et al. |
| 7,761,569 B2 | 7/2010 | Hopkins |
| 7,783,749 B2 | 8/2010 | Hopkins |
| 8,108,455 B2 | 1/2012 | Yeager |
| 8,214,369 B2 | 7/2012 | Burdick |
| 2001/0003191 A1 | 6/2001 | Kovacs et al. |
| 2001/0037325 A1 | 11/2001 | Bideerman et al. |
| 2002/0016786 A1 | 2/2002 | Pitkow et al. |
| 2002/0044549 A1 | 4/2002 | Johansson et al. |
| 2002/0059204 A1 | 5/2002 | Harris |
| 2002/0065832 A1 | 5/2002 | MacK |
| 2002/0069098 A1 | 6/2002 | Schmidt |
| 2002/0073204 A1 | 6/2002 | Dutta et al. |
| 2002/0087885 A1 | 7/2002 | Peled et al. |
| 2002/0129140 A1 | 9/2002 | Peled et al. |
| 2002/0138471 A1 | 9/2002 | Dutta et al. |
| 2002/0143989 A1 | 10/2002 | Huitema et al. |
| 2002/0152262 A1 | 10/2002 | Arkin et al. |
| 2002/0161844 A1 | 10/2002 | Overtoom |
| 2002/0181395 A1 | 12/2002 | Foster et al. |
| 2002/0184310 A1 | 12/2002 | Traversat et al. |
| 2002/0188735 A1 | 12/2002 | Needham et al. |
| 2003/0005035 A1 | 1/2003 | Rodgers |
| 2003/0037167 A1 | 2/2003 | Garcia-Luna-Aceves et al. |
| 2003/0050966 A1 | 3/2003 | Dutta et al. |
| 2003/0055892 A1 | 3/2003 | Huitema et al. |
| 2003/0050980 A1 | 4/2003 | Dutta et al. |
| 2003/0078889 A1 | 4/2003 | Lee et al. |
| 2003/0088544 A1 | 5/2003 | Kan et al. |
| 2003/0095660 A1 | 5/2003 | Lee et al. |
| 2003/0112823 A1 | 6/2003 | Collins et al. |
| 2003/0126136 A1 | 7/2003 | Omoigui |
| 2003/0126199 A1 | 7/2003 | Kadri et al. |
| 2003/0135495 A1 | 7/2003 | Vagnozzi |
| 2003/0145093 A1 | 7/2003 | Oren et al. |
| 2003/0182428 A1 | 9/2003 | Li et al. |
| 2003/0191828 A1 | 10/2003 | Ramanathan et al. |
| 2003/0195852 A1 | 10/2003 | Campbell et al. |
| 2003/0202468 A1 | 10/2003 | Cain et al. |
| 2003/0208621 A1 | 11/2003 | Bowman |
| 2003/0212710 A1 | 11/2003 | Guy |
| 2004/0019650 A1 | 1/2004 | Auvenshine |
| 2004/0030651 A1 | 2/2004 | Kim et al. |
| 2004/0034652 A1 | 2/2004 | Hofmann et al. |
| 2004/0039921 A1 | 2/2004 | Chuang |
| 2004/0044790 A1 | 3/2004 | Loach et al. |
| 2004/0044996 A1 | 3/2004 | Atallah |
| 2004/0088347 A1* | 5/2004 | Yeager et al. ............... 709/202 |
| 2004/0088348 A1* | 5/2004 | Yeager .................. H04L 67/104 709/202 |
| 2004/0098370 A1 | 5/2004 | Garland et al. |
| 2004/0103297 A1 | 5/2004 | Risan et al. |
| 2004/0111604 A1 | 6/2004 | Fournier |
| 2004/0122958 A1 | 6/2004 | Wardrop |
| 2004/0133571 A1 | 7/2004 | Horne et al. |
| 2004/0139211 A1 | 7/2004 | Baker et al. |
| 2004/0143842 A1 | 7/2004 | Joshi |
| 2004/0148275 A1 | 7/2004 | Achlioptas |
| 2004/0148434 A1 | 7/2004 | Matsubara et al. |
| 2004/0153472 A1 | 8/2004 | Rieffanaugh |
| 2004/0153658 A1 | 8/2004 | Gunyakti et al. |
| 2004/0157641 A1 | 8/2004 | Chithambaram et al. |
| 2004/0158630 A1 | 8/2004 | Chang et al. |
| 2004/0162871 A1 | 8/2004 | Pabla et al. |
| 2004/0196784 A1 | 10/2004 | Larsson et al. |
| 2004/0218532 A1 | 11/2004 | Khirman |
| 2004/0220926 A1 | 11/2004 | Lamkin et al. |
| 2004/0230572 A1 | 11/2004 | Omoigui |
| 2004/0236945 A1 | 11/2004 | Risan et al. |
| 2004/0250106 A1 | 12/2004 | Annese et al. |
| 2004/0250122 A1 | 12/2004 | Newton |
| 2004/0260761 A1 | 12/2004 | Leaute et al. |
| 2004/0260801 A1 | 12/2004 | Li |
| 2005/0027821 A1 | 2/2005 | Alexander et al. |
| 2005/0038898 A1 | 2/2005 | Mittig et al. |
| 2005/0043548 A1 | 2/2005 | Cates |
| 2005/0047390 A1 | 3/2005 | Park et al. |
| 2005/0060297 A1 | 3/2005 | Najork |
| 2005/0080858 A1 | 4/2005 | Pessach |
| 2005/0091167 A1 | 4/2005 | Moore et al. |
| 2005/0091202 A1 | 4/2005 | Thomas |
| 2005/0091397 A1 | 4/2005 | Roberts et al. |
| 2005/0028012 A1 | 5/2005 | Amamiya et al. |
| 2005/0108203 A1 | 5/2005 | Tang et al. |
| 2005/0108248 A1 | 5/2005 | Natunen |
| 2005/0114709 A1 | 5/2005 | Moore |
| 2005/0119998 A1 | 6/2005 | Greco et al. |
| 2005/0125374 A1 | 6/2005 | Curtis et al. |
| 2005/0125673 A1 | 6/2005 | Cheng et al. |
| 2005/0144288 A1 | 6/2005 | Liao |
| 2005/0163050 A1 | 7/2005 | Hopkins |
| 2005/0163133 A1 | 7/2005 | Hopkins |
| 2005/0163135 A1 | 7/2005 | Hopkins |
| 2005/0187942 A1 | 8/2005 | Dutta et al. |
| 2005/0203851 A1 | 9/2005 | King et al. |
| 2005/0203892 A1 | 9/2005 | Wesley et al. |
| 2005/0229243 A1 | 10/2005 | Svendsen et al. |
| 2005/0229255 A1 | 10/2005 | Gula et al. |
| 2005/0250106 A1 | 11/2005 | Epstein et al. |
| 2005/0265259 A1 | 12/2005 | Thubert et al. |
| 2005/0267945 A1 | 12/2005 | Cohen et al. |
| 2006/0020814 A1 | 1/2006 | Lieblich et al. |
| 2006/0029093 A1 | 2/2006 | Van Rossum |
| 2006/0034177 A1 | 2/2006 | Schrempp |

(56) References Cited

U.S. PATENT DOCUMENTS

| | | |
|---|---|---|
| 2006/0039297 A1 | 2/2006 | McNab |
| 2006/0117372 A1 | 6/2006 | Hopkins |
| 2006/0136837 A1 | 6/2006 | Ben-Shachar et al. |
| 2006/0209819 A1 | 9/2006 | Jennings et al. |
| 2006/0248062 A1 | 11/2006 | Libes et al. |
| 2006/0282309 A1 | 12/2006 | Zhang |
| 2007/0088622 A1 | 4/2007 | Floyd |
| 2007/0124721 A1 | 5/2007 | Cowing et al. |
| 2007/0153703 A1* | 7/2007 | Floyd .................... G06Q 30/00 370/252 |
| 2007/0153710 A1 | 7/2007 | Hopkins |
| 2007/0162463 A1 | 7/2007 | Kester et al. |
| 2008/0263013 A1 | 10/2008 | Hopkins |
| 2008/0319861 A1 | 12/2008 | Hopkins |
| 2009/0024618 A1 | 1/2009 | Fan et al. |
| 2010/0042732 A1 | 2/2010 | Hopkins |
| 2011/0065595 A1 | 3/2011 | Hopkins |

FOREIGN PATENT DOCUMENTS

| | | |
|---|---|---|
| EP | 1 402 364 B1 | 3/2006 |
| JP | 2003-167885 A | 6/2003 |
| JP | 2010-509674 | 3/2010 |
| WO | WO 03/009524 | 1/2003 |
| WO | WO 2003/009524 A2 | 1/2003 |
| WO | WO 2004/046960 A1 | 6/2004 |
| WO | WO 2004/075076 A1 | 9/2004 |
| WO | WO 2005/074229 A1 | 8/2005 |
| WO | WO 2005/074230 A2 | 8/2005 |
| WO | WO 2006/110823 A3 | 10/2006 |
| WO | WO 2006/124027 A1 | 11/2006 |
| WO | WO 2008/057509 | 5/2008 |
| WO | WO 2008/127608 A3 | 10/2008 |
| WO | WO 2008/154016 | 12/2008 |

OTHER PUBLICATIONS

Lindemann, C., et al., "A Distributed Search Service for Peer-to-Peer File Sharing in Mobile Applications," *Peer-to-Peer Computing*, 2002, *Proceedings of the Second International Conference on Peer-to-Peer Computing*, Sep. 5-7, 2002.

Wiley, B., "Peer-to-Peer: Harnessing the Power of Disruptive Technologies," *Ch. 19 Interoperability Through Gateways*, 381-397 (Mar. 2001).

Scarlata, V., et al., "Responder Anonymity and Anonymous Peer-to-Peer File Sharing," *Proceedings of the International Conference on Network Protocols*, pp. 272-280, Nov. 11, 2001.

Xiao, L., et al., "Mutual Anonymity Protocols for Hybrid Peer-to-Peer Systems," *Proceedings of the 23rd International Conference on Distributed Computing Systems*, May 19-22, 2003.

Zupeng, Li, et al., "Research of Peer-to-Peer Network Architecture," *Proceedings of ICCT*, 312-315 (2003).

Marmor, Michael, S., "Make the P2P Lead with Toadnode," www.webtecniques.com, pp. 44-49 Dec. 2000.

Ueda, Kiyoshi, et al., "Peer-to-Peer Network Topology Control within a Mobile Ad-hoc Network," 2003 *IEEE*, pp. 243-247.

Liu, J., et al., "Distributed Distance Measurement for Large-Scale Networks," *Computer Networks*, 41:177-192 (2003).

Siu Man Lui and Sai Ho Kowk, "Interoperability of Peer-to-Peer File Sharing," *ACM SIGecom Exchanges*, 3(3):25-33, Aug. 2002.

Zhenyun Zhuang, et al. "Hybrid Periodical Flooding in Unstructured Peer-to-Peer Networks," Proceedings of the 2003 International Conference on Parallel Proceeding.

Steven Hessing, "Peer to Peer Messaging Protocol," Internet-Draft, pp. 1-57, Apr. 2002.

Shi, W., et al., "Tuxedo: A Peer-to-Peer Caching System," Department of Computer Science, Wayne University.

Hwang, J., and Aravamudham, P., "Proxy-Based Middleware Services for Peer-to-Peer Computing in Virtually Clustered Wireless Grid Networks," School of Information Studies, Syracuse University, CST 4-291.

Kim, K., and Park, D., "Subway: Peer-to-Peer Clustering of Clients for Web Proxy," Department of Electrical Engineering and Computer Science, [on line, Retrieved on Sep. 25, 2007]. Retrieved from the Internet URL:http://66.102.1.104/scholar?hi=en&lr=&q=cache:Cljbt8-S9ckJ:ideal.cecs.missouri.edu/IMC/papers/377PD . . . .

*Tiversa, Inc., et al v. Cohen & Grigsby, P.C., Civil Division*, Case No. GD 07/001515, Court of Common Pleas of Allegheny County, Pennsylvania, "Complaint," 89 pages, dated Sep. 5, 2007.

*Tiversa, Inc., et al v. Cohen & Grigsby, P.C.*, Court of Common Pleas of Allegheny County, Pennsylvania, "Preliminary Objections and Brief in Support of Preliminary Objections," 18 pages, dated Oct. 15, 2007.

*Tiversa, Inc., et al v. Cohen & Grigsby, P.C.*, Court of Common Pleas of Allegheny County, Pennsylvania, "First Amended Complaint," 90 pages, dated Nov. 5, 2007.

*Tiversa, Inc., et al v. Cohen & Grigsby, P.C., Civil Division*, Case No. GD 07/001515, Court of Common Pleas of Allegheny County, Pennsylvania, "Defendant's Preliminary Objections to First Amended Complaint and Brief in Support," 14 pages, dated Nov. 21, 2007.

*Tiversa, Inc., et al v. Cohen & Grigsby, P.C., Civil Division*, Case No. GD 07/001515, Court of Common Pleas of Allegheny County, Pennsylvania, "Court Order re: Defendant's Preliminary Objections to First Amended Complaint and Brief in Support," 14 pages, dated Nov. 27, 2007.

*Tiversa, Inc., et al v. Cohen & Grigsby, P.C., Civil Division*, Case No. GD 07/001515, Court of Common Pleas of Allegheny County, Pennsylvania, "Second Amended Complaint," 89 pages, dated Dec. 11, 2007.

*Tiversa, Inc., et al v. Cohen & Grigsby, P.C., Civil Division*, Case No. GD 07/001515, Court of Common Pleas of Allegheny County, Pennsylvania, "Answer to Second Amended Complaint," 454 pages, dated Jan. 30, 2008.

*Tiversa, Inc., et al v. Cohen & Grigsby, P.C., Civil Division*, Case No. GD 07/001515, Court of Common Pleas of Allegheny County, Pennsylvania, "Reply to New Matter," 16 pages, dated Feb. 19, 2008.

Goel, S. et al., "A Resilient Network That Can Operate Under Duress: To Support Communication Between Government Agencies During Crisis Situations," in *System Sciences 2004, Proceedings of the 37th Annual Hawaii International Conference on*, Jan. 5-8, 2004, Posted online: Feb. 26, 2004 10:51:19.0. (retrieved on Jun. 16, 2007) Retrieved from the Internet: URL:http://csd2.computer.org/comp/proceedings/hiscc/2004/2056/05/205650123a.dpf.

Mondal, A., et al., "Effective load-balancing of peer-to-peer systems," Online, Mar. 2002, XP002299388.

Andersen, S. et al., "Changes to Functionality in Microsoft Windows XP Service Pack 2 Part 2: Network Protection Technologies," Online, Sep. 15, 2004, pp. 1-56, XP002330123.

Markatos, E. P., "Tracing a large-scale peer to peer system: an hour in the life of Gnutella," Cluster Computering and Grid 2nd IEEE/ACM International Symposium CCGRID2002 Berlin, Germany, May 21-24, 2002, IEEE Coomput. Soc., US, pp. 65-74.

Microsoft TechNet, Changes to Functionality in Microsoft Windows XP Service Pack 2, Introduction [online Retrieved on Oct. 26, 2007] Retrieved from URL: http://technet.microsoft.com/en-us/library/bb457151(d=printer).aspx. pp. 1-3.

Microsoft TechNet, Changes to Functionality in Microsoft Windows XP Service Pack 2, Part 2: Network Protection Technologies [online Retrieved on Oct. 26, 2007] Retrieved from URL: http://technet.microsoft.com/en-us/library/bb457156(d=printer).aspx. pp. 1-37.

Wiley, B., edited by Andy Oram "Peer-to-Peer: Harnessing the Benefits of Disruptive Technology," *Ch. 19 Interoperability Through Gateways*, 380-397 (18 pages) (2001).

Notification Concerning Transmittal of International Preliminary Report on Patentability and Written Opinion for PCT/US2008/007262, dated Feb. 11, 2010 (7 pages).

Notification Relating to Priority Claim and Notification Concerning Submission or Transmital of Priority Document with Partial International Search Report for PCT/US2005/001623, dated Jul. 12, 2005, (7 pages).

(56) References Cited

OTHER PUBLICATIONS

Notification Concerning Transmittal of International Preliminary Report on Patentability for PCT/US2005/001623, dated Aug. 3, 2006 (2 pages).
Notification of Transmittal of the International Search Report and Written Opinion of the International Searching Authority for PCT/US2005/001623, dated Jul. 25, 2005 (26 pages).
Supplementary International Search Report dated May 4, 2012 for Application No. EP 08 76 8320, International Filing Date Jun. 11, 2008 for Applicant Tiversa, Inc., 6 pages.
International Search Report and Written Opinion of the ISA dated Feb. 26, 2009 in connection with PCT Application No. PCT/US08/004614.
International Search Report and Written Opinion of the ISA dated Sep. 12, 2007 in connection with PCT Application No. PCT/US06/13666.
International Search Report and Written Opinion of the ISA dated Jun. 15, 2005 in connection with PCT Application No. PCT/US05/001622.
Brandon Wiley, Freenet. "Inoperability Through Gateways," Chapter 19, pp. 381-392.
Zhu, et al., "SDQE: Towards Automatic Semantic Query Optimization in P2P Systems," Information Processing & Management, 42(1), pp. 222-236 Oct. 26, 2004.
Oram, A., "Peer-to-Peer: Harnessing the Power of Disruptive Technologies," Ch.10 Interoperability Through Gateways. Mar. 2001, p. 381-392.
United States House of Representatives Committee on Government Reform—Staff Report Prepard for Rep. Tom Davis and Rep. Henry A. Waxman, "File-Sharing Programs and Peer-to-Peer Networks Provacy and Security Risk," May 13, 2003, pp. 1-12.
United States General Accounting Office, Report to the Chairman and Ranking Minority Member, Committee on Government Reform, House of Representatives, "File Sharing Programs—Peer-to-Peer Networks Provide Ready Accessto Child Pornography." Feb. 2003, pp. 1-32.
Couch, William, "Peer-to-Peer File-Sharing Networks: Security Risk," SANS Institute InfoSec Reading Room, 2002, pp. 1-11.
Davidson, Alan, "Peer-to-Peer File Sharing Privacy and Security," Center for Democracy and Technology, May 15, 2003, pp. 1-16.
AA-2002.02—File Sharing Activity Part 1 of 2—Security Implications of Using Peer-to-Peer File Sharing Software, May 12, 2002, pp. 1-5.
International Search Report dated May 14, 2008 in connection with PCT Application No. PCT/US07/23321.
Phemus, "Secret Manual for Downloading: Final Second Part of Answers to Questions for Downloading." PC Japan, vol. 5, 11, pp. 174-179, Nov. 1, 2000.

\* cited by examiner

Resultant Information

| 16 byte descriptor id | a payload descriptor id | Time to live value | a hops value | a payload length | Payload (e.g., file titles, TCP/IP port, an IP address, host speed, the result set with a file index, a file size, a file name, and a servent ID number |
|---|---|---|---|---|---|
| 1107 | 1119 | 1137 | 1142 | 1147 | 1152 |

Search Packet

| 16 byte descriptor id | a payload descriptor id | Time to live value | a hops value | a payload length (e.g., search term length) | Search Term | Minimum user speed |
|---|---|---|---|---|---|---|
| 1205 | 1210 | 1215 | 1220 | 1225 | 1230 | 1235 |

2006 credit card
2006 credit card number
2007 credit card numbers
aa credit card application
aarons checking account
account access
account application
account application forms
account balances
account checking
account chq
account credit card
account information
account passwords
account passwords user id
account statement
account summary information
account summary july
account transfer
accounting financial gaap
accounting of credit card
accounts my passwords
accounts october september
accounts payable
accounts payable procedure
accounts receivable
accounts with paperwork by
accredited credit cards
ad credit card authorization
addresses cards credit names
checking account activity
checking account fsnb
checking account info
checking account number
checking savings admin nv visa request
anthony pappa balance cd1
authorization credit card
authorization for credit card
authorization for payment form
authorization to debit account
auto payment
bank account
bank account access permission
bank account change
bank account number
bank account numbers
bank account password
bank account verification form
bank accounts
bank accounts details
bank accounts security codes
bank balance
bank credit card
bank credit card information
bank credit cards passwords
bank numbers card credit my
bank staffs credit cards only
capital accounts
capital accounts 31 dec04 inv
card account
card auth credit
card credit numbers
card payment
cards credit credit card
carte visa
cc pin
cc visa
cdn credit card auth
checking account

FIG. 13B

SYSTEM AND METHOD FOR ADVERTISING ON A PEER-TO-PEER NETWORK

RELATED APPLICATION(S)

This application claims the benefit of U.S. Provisional Application No. 60/934,150, filed on Jun. 11, 2007, which is related to U.S. Provisional Patent Application No. 60/923,042, filed on Apr. 12, 2007. This application is related to U.S. patent application Ser. No. 12/082,407, filed on Apr. 10, 2008, which claims the benefit of U.S. Provisional Application No. 60/923,042, filed on Apr. 12, 2007. The teachings of all the above applications are incorporated herein by reference in their entireties.

BACKGROUND OF THE INVENTION

Peer-to-Peer network users issue over 800 million searches a day compared to the 250 million searches a day users issue on the World Wide Web. A Peer-to-Peer network relies primarily on the computing power and bandwidth of participants in a network and are generally used for connecting nodes via connections. One use for such a network is sharing content files. Content files may contain audio, video, data, or other digital formats. The content is typically accessed in real-time data using Peer-to-Peer technology. To access a Peer-to-Peer network for sharing, a user utilizes a Peer-to-Peer network software application that is capable of connecting to the Peer-to-Peer network.

An example Peer-to-Peer network includes multiple nodes, where each node has a file server and a client capable of sending and receiving data, such as a "communication message" between nodes. A node is typically connected to other nodes in a network. In some Peer-to-Peer networks, a node connects to other nodes over a communications path, such as the Internet or proxy. For example, FIG. 1 shows a Peer-to-Peer network connection capable of searching for shared files. To search on a Peer-to-Peer network, a process issues a search request and an originating node sends the search request to receiving nodes (e.g., each node that the originating nodes is connected). Each receiving node searches for a match and responds to the requesting node with location information for each match. Another variation of a Peer-to-Peer network is shown in FIG. 3. In particular, FIG. 3 shows a non-proxy loop network wherein each node is directly connected to another.

In other Peer-to-Peer proxy networks, there may be multiple nodes as illustrated in FIG. 2. FIG. 2 shows node A connected to node B and, in turn, node B is connected to node C. In this example, node A is not directly connected to node C. In use, node A issues a search request to node B and node B searches shared files for a match. If a match is found, node B sends a response back to node A including a location for the shared file. After responding to node A, node B forwards node A's request to node C. In response, node C searches the shared files for a match and responds to node B with a location of each shared file. Node B then forwards a response back to node A.

Peer-to-Peer networks may also use a leaf node/main node proxy topology as illustrated in FIG. 4. In this network variation, one or more nodes are classified as main nodes and the other nodes are classified as leaf nodes. A leaf node may only connect to main nodes and main nodes can connect to other main nodes. Thus, if a leaf node issues a search request, the leaf node sends the search request to a main node connects to the leaf node. Upon receiving the search request, the main node forwards the request to each leaf node and main nodes connected to the requesting main node. The receiving main node forwards each search request to each of the leaf nodes that they are in connection with.

In some cases, Peer-to-Peer networks can include millions of nodes that use a large amount of bandwidth. To reduce the bandwidth used in operating such networks, many Peer-to-Peer networks restrict the "distance" of messages traveling the network (e.g., limit hops or Time to Live (TTL)). For example, a Peer-to-Peer network may be limited to performing only five hops as shown in FIG. 5. For example, Node A may issue a search request to Node B. In turn, Node B passes the search request to Node C, and so forth until reaching Node F. Since, the Peer-to-Peer network is limited to five hops, the search requests end at Node F and do not pass to any additional nodes. It is useful to note that other mechanisms are also employed in networks for limiting the search capabilities of users.

FIG. 6 shows network nodes communicating over a transmission distance of three nodes. In particular, node A 605 communicates with each node within the A circle 610. Similarly, node B 615 communicates with each node within the B circle 620. Likewise, node C 625 communicates with each node within the C circle 630 and with each node within the B circle 620 that is overlapping the C circle 630. However, no node can communicate with a non-overlapping area or within a corresponding circle. Thus, there is a need to access nodes without regard to location while using unlimited search requests in a manner positive to business development.

SUMMARY OF THE INVENTION

In an embodiment, a system or method for advertising on a Peer-to-Peer network detects a search request of a node in a Peer-to-Peer network. After detecting a search request, the system prepares an unsolicited response to the search request of the node. Once the unsolicited response is prepared, the system sends the unsolicited response to the node. For example, a Peer-to-Peer network node issues a search request and a system, employing the principles of the present invention, prepares an advertisement (e.g., an unsolicited response). After preparing the advertisement, the system sends the advertisement to the Peer-to-Peer network node that issued the search request. The process of sending advertisements can be made to each node issuing a search request without discrimination.

In an embodiment, a node on a Peer-to-Peer network accesses each search query within a transmission distance and responds with advertisements for each search query. The node is capable of accessing more nodes, each node originating a search query instead of complying with the limitations of a Peer-to-Peer network (e.g., limited hops).

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 11 is an example list of resultant information according to an example embodiments of the invention;

FIG. 12 is an example block diagram depicting an example search packet according to example embodiments of the invention;

FIG. 13B is an example criteria according to an example embodiments of the invention;

DETAILED DESCRIPTION OF THE INVENTION

A description of example embodiments of the invention follows.

In an embodiment, an advertisement system provides advertising to an unrestricted amount of users or nodes on a Peer-to-Peer network. The advertisement system can communicate with more users than a Peer-to-Peer node because there are no restrictions. Since the advertisement system can communicate with more nodes, the advertisement system can send advertisements to a larger group of Peer-to-Peer networks.

In operation, the advertisement system connects to a Peer-to-Peer network, detects searches or search queries made by nodes, and responds with advertising information to an advertisement location. The advertisement location is determined by the origination of the searches made by the nodes or users. Further, the advertisement locations can be in the form of a filename, file, message, or a pointer to a file. The content of the advertisement location may include a product placement ad or a music or video file that contains an advertisement.

The Advertising System may also allow an issued advertisement to be propagated to multiple users or nodes. If a user, for example, downloads an advertisement (e.g., from a song), the advertisement spreads to other users as part of Peer-to-Peer network usage. For example, a first normal Peer-to-Peer user downloads an advertisement in the form of a music file from the Advertisement System. A second user issues a search for the music file and downloads it from the first user and receives the advertisement. This cycle continues over multiple points on the network using the server/client model of the Peer-to-Peer network to distribute the file(s).

Figure 1:
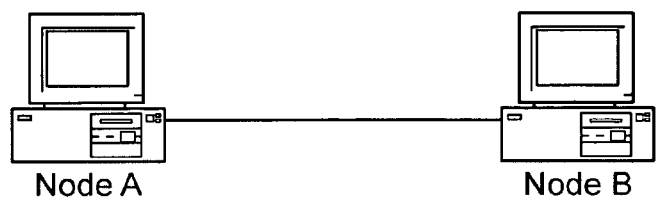
FIG. 1 is an example schematic view of a Peer-to-Peer network.
Figure 2:
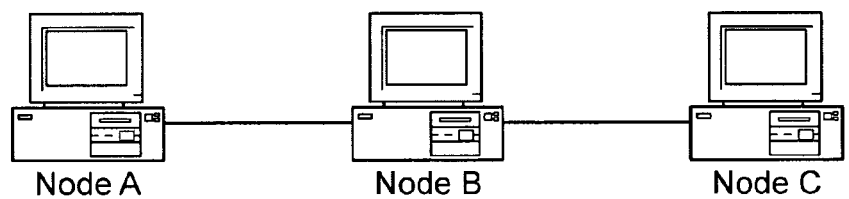
FIG. 2 is an example schematic view of a Peer-to-Peer proxy network.
Figure 3:
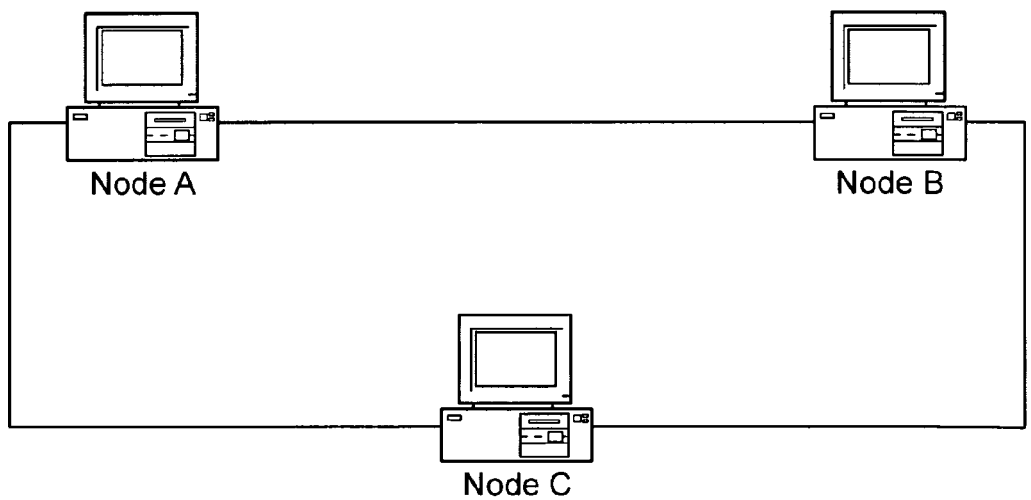
FIG. 3 is an example schematic view of a Peer-to-Peer, non-proxy, and loop network.
Figure 4:
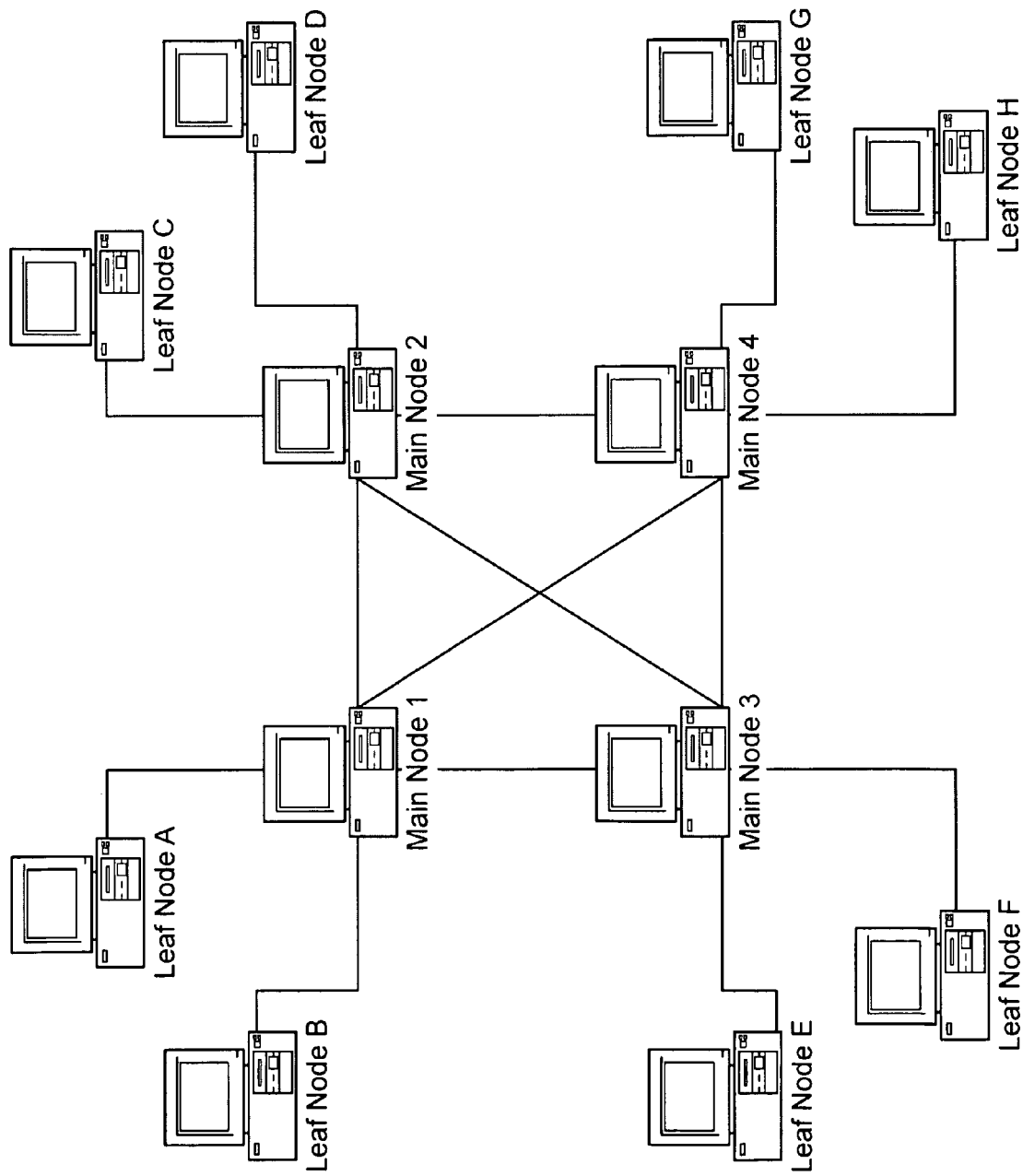
FIG. 4 is an example schematic view of a Peer-to-Peer leaf/main node network.
Figure 5:
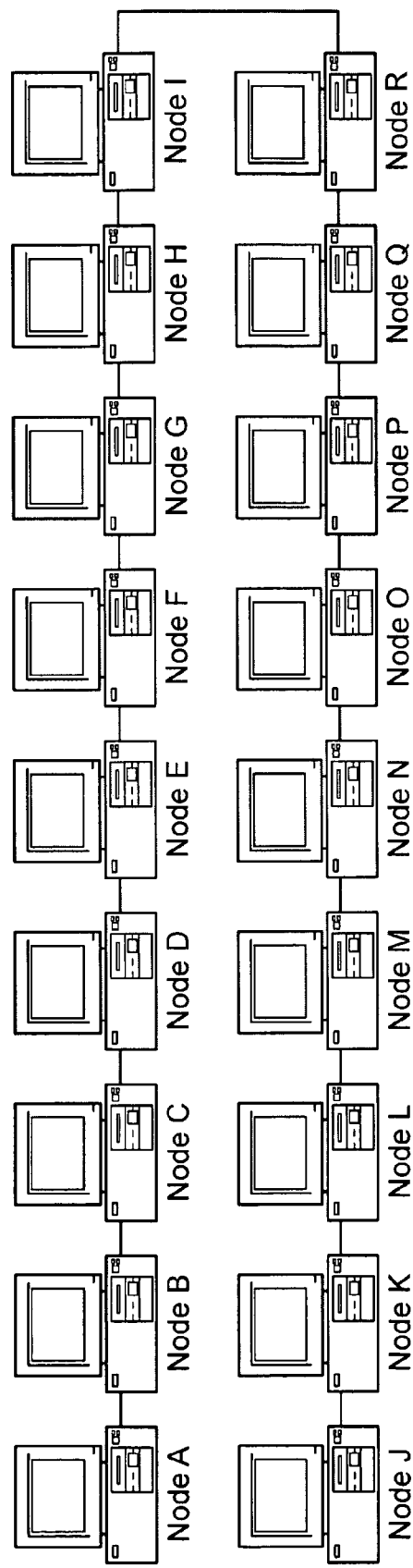
FIG. 5 is an example schematic view of a Peer-to-Peer network wherein multiple nodes are connected and access is limited by network rules.
Figure 6:
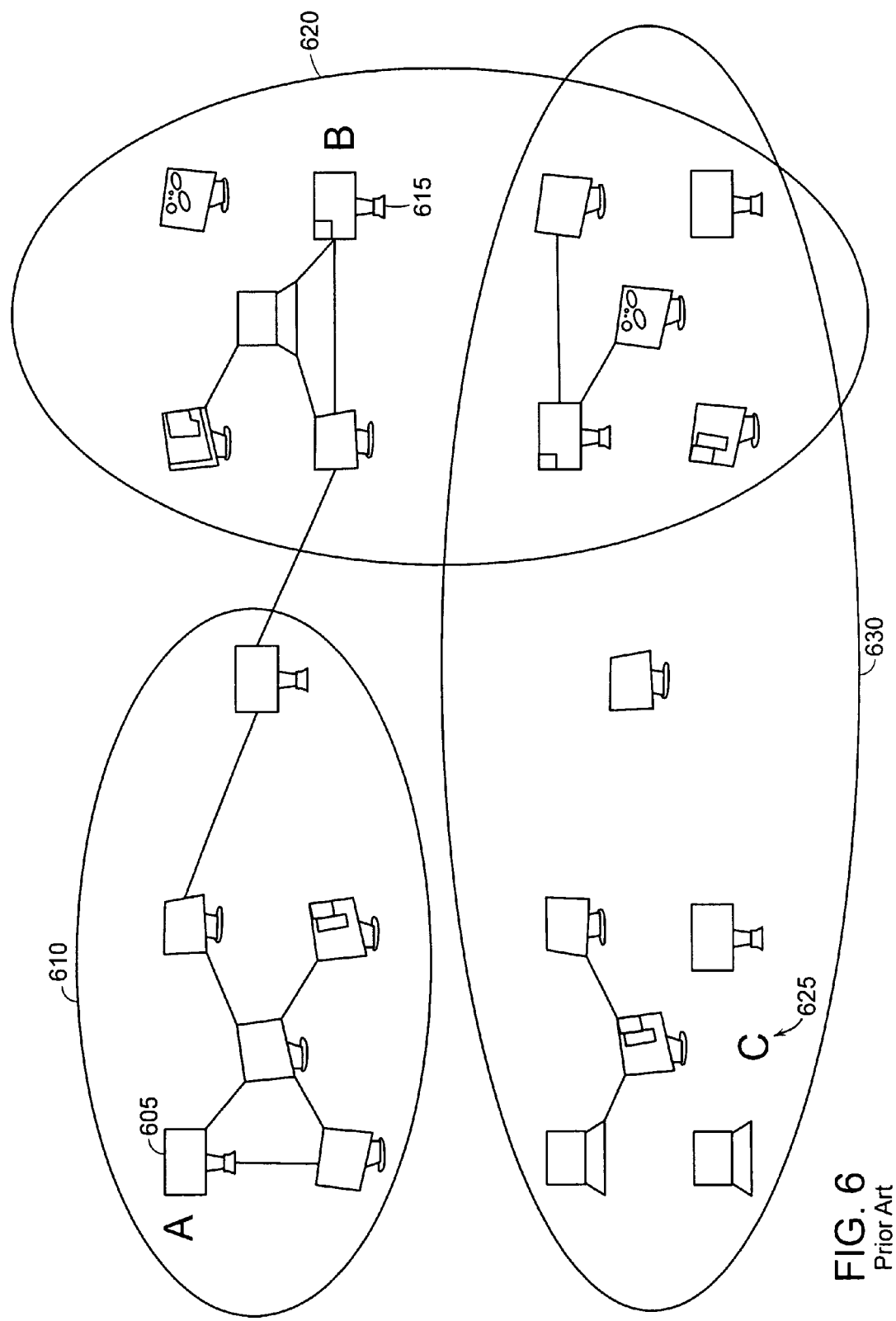
FIG. 6 shows an example network nodes communicating over a transmission distance of three nodes.
Figure 7:
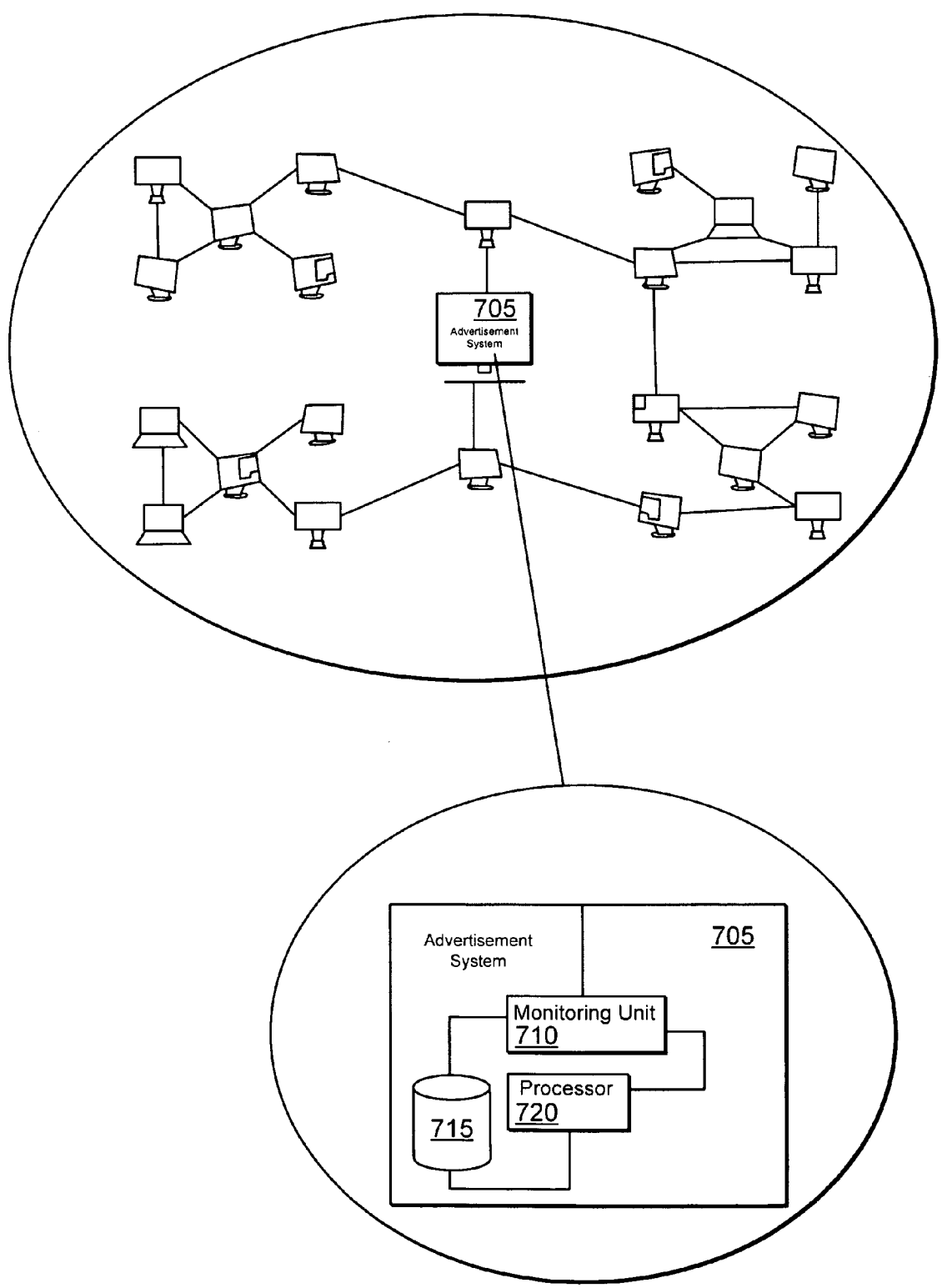
FIG. 7 is an example schematic view of an advertisement system communicating over multiple connections.

FIG. 7 shows an example advertisement system 705 coupled to one or more network node in a Peer-to-Peer network. The advertisement system 705 includes a monitoring unit 710, a database 715, and a processor 720. The monitoring unit 705 detects search requests originated by a user located at a originating (requesting) node. The receiving node searches for a match and responds to the originating node with location information for each match. A processor 720 in communication with the monitoring unit 710 prepares an advertisement in response to the search request and sends the advertisement to the user making the search request. The processor 720 retrieves the selected advertisement from a database 715.

In an embodiment, the advertisement system 705 may connect to main nodes, super nodes, ultra Peers, or other centralizing node without providing service directly to the nodes. These nodes may be configured from a central source and may share information, such as configuration information, among the nodes. For example, the nodes may connect to random nodes, or use a network topography system to deduce the most efficient places to connect.

In an embodiment, the advertisement system detects a search query from a user. The search query may be compared with predetermined criteria. If the search query and predetermined criteria either match or are related, the advertisement system responds by sending an advertisement to the user or node. For example, if a user issued a search query for "Singer song X," the advertisement system sends an advertisement for Singer's next concert. On the other hand, if the advertisement system does not use a filter based on predetermined criteria, the advertisement system sends advertisements without regard to the topic in the search query. For example, the same "Singer song X" search would result in an advertisement for "Car B." It is useful to note that predetermined criteria and search queries do not require and exact match. For example, a user may issue a search query for "Singer's Greatest Hits" and match predefined criteria of "Singer."

Comparisons for predetermined criteria and search strings are made using inter string, complete string, partial string, fuzzy logic, patricia tree, or other useful comparing technique. Comparisons can occur in parallel with other searches to increase throughput of the network (e.g., serial processing). If a match is made, the advertising system builds a response to the search request. The search response may also include an IP address of the advertisement system, programming logic, other system information, or a Peer-to-Peer Identification (ID).

An IP address uniquely identifies a user's internet presence and is composed of four bytes of information representing a domain name and an identification number in that domain. By knowing the IP address of a user, an internet connection can be established with that user. Peer-to-Peer networks are characterized by dynamically-formed, self-organized and self-managed, robust, server-less communication peer networks (sometimes referred to as meshes). Each node is identified by a unique (within the mesh) peer ID. Each node shares bidirectional connections with at least its nearest neighbors. Tracking Peer-to-Peer IDs is useful to the advertisement system because Peer-to-Peer IDs are not managed by a central authority, but rather assigned at random. Thus, the advertisement system can prepare a response to include any IP address or Peer-to-Peer ID by the information in the search response. For example, a user makes a search request at the originating node for "Madonna CDs" in the Peer-to-Peer network. The advertisement system may store at least one stored object, such as "Madonna." The advertisement system makes a match between the stored object (e.g., Madonna) and the requested object (e.g., Madonna CDs) and then generates an advertisement, for example, Madonna's next concert. The advertisement system acquires the unique ID that is associated with the originating node. The advertisement system is then able to respond to the user with the advertisement by knowing the originating node unique ID.

Moreover, the advertisement system is capable of determining locations to provide advertisements. More specifically, the advertisement system connects to a Peer-to-Peer network having multiple connections in a manner where each connection has no overlapping node(s). Specifically, the Advertisement system locates connection points by issuing a search from a first connection and detecting if the search appears on a second connection. If the search does not exist in the second connection, the two nodes are not connected. Alternatively, the Advertisement System connects to a Peer-to-Peer network at preferential points, such as high traffic areas. The Advertisement could locate high traffic areas by monitoring the number of searches that are being issued from a certain area and comparing it to a threshold or second area.

Figure 8:
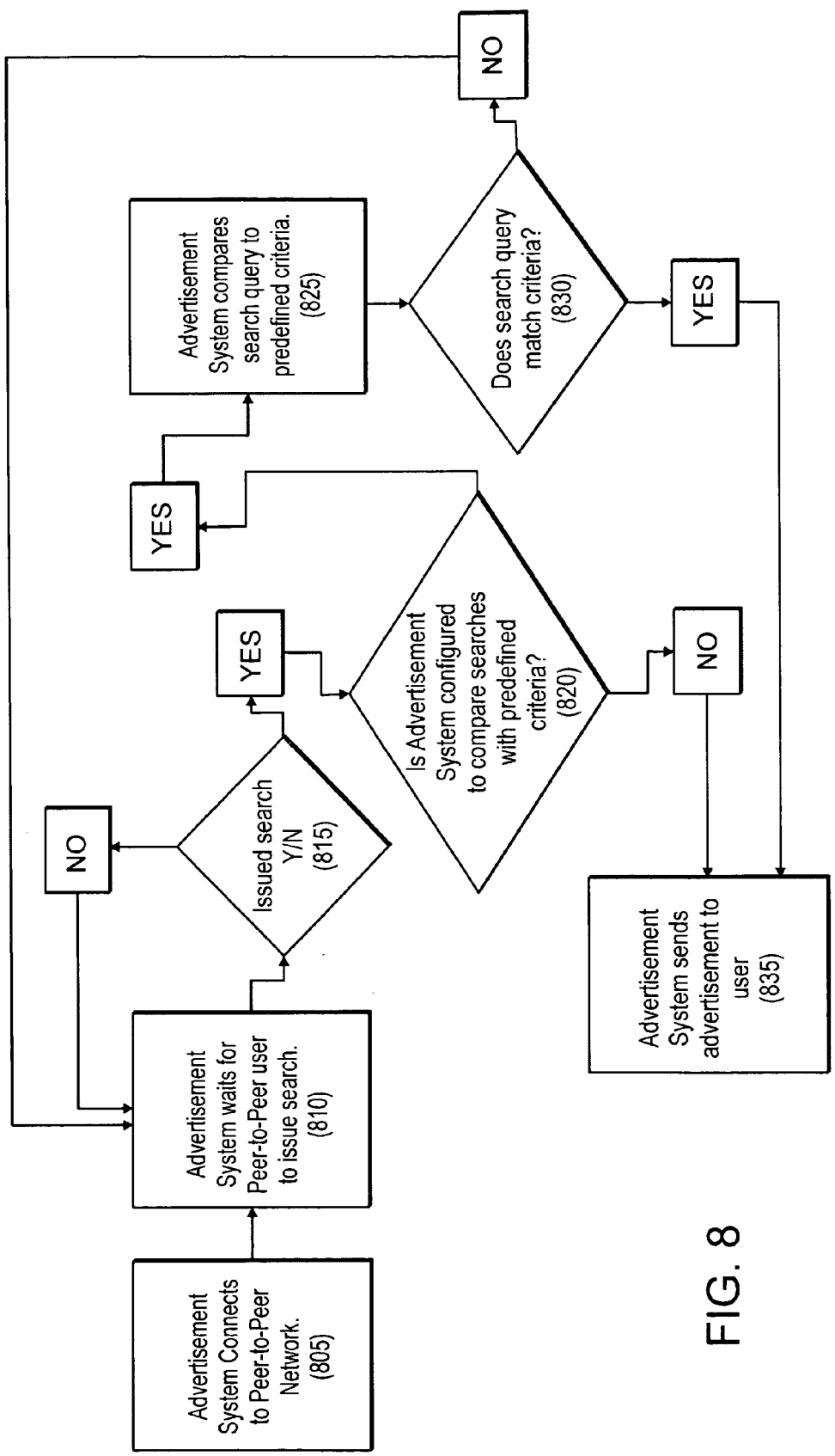
FIG. 8 is an example flow diagram illustrating sending advertisements to a user.

FIG. 8 is a flow diagram illustrating a process of sending advertisements to a user in more detail. An advertisement system connects (805) to a Peer-to-Peer network. Next, the advertisement system waits (810) for issued search (815) on the Peer-to-Peer network. If the advertisement system is configured (820) to use pre-defined criteria, the advertisement system compares (825) the search query for matching criteria (830). In an embodiment, pre-defined criteria is a list of keywords that have been selected to be monitored for, and if matched would result in the advertisement system providing an advertisement to the searcher. For example, pre-defined criteria can be a singer's name. Once the criteria is matched, the advertisement system sends the advertisement to a user. If the advertisement system is not configured (820) to use pre-defined criteria, the advertisement system sends the advertisement to a user regardless of the search term issued by the user. The advertisement system can utilize any feature of the Peer-to-Peer network that would be able to provide information to the user. In an embodiment, an advertisement system sends back a response where a document filename includes the advertisement message (e.g., "Purchase Singer ABC's Newest Record.doc").

Figure 9:
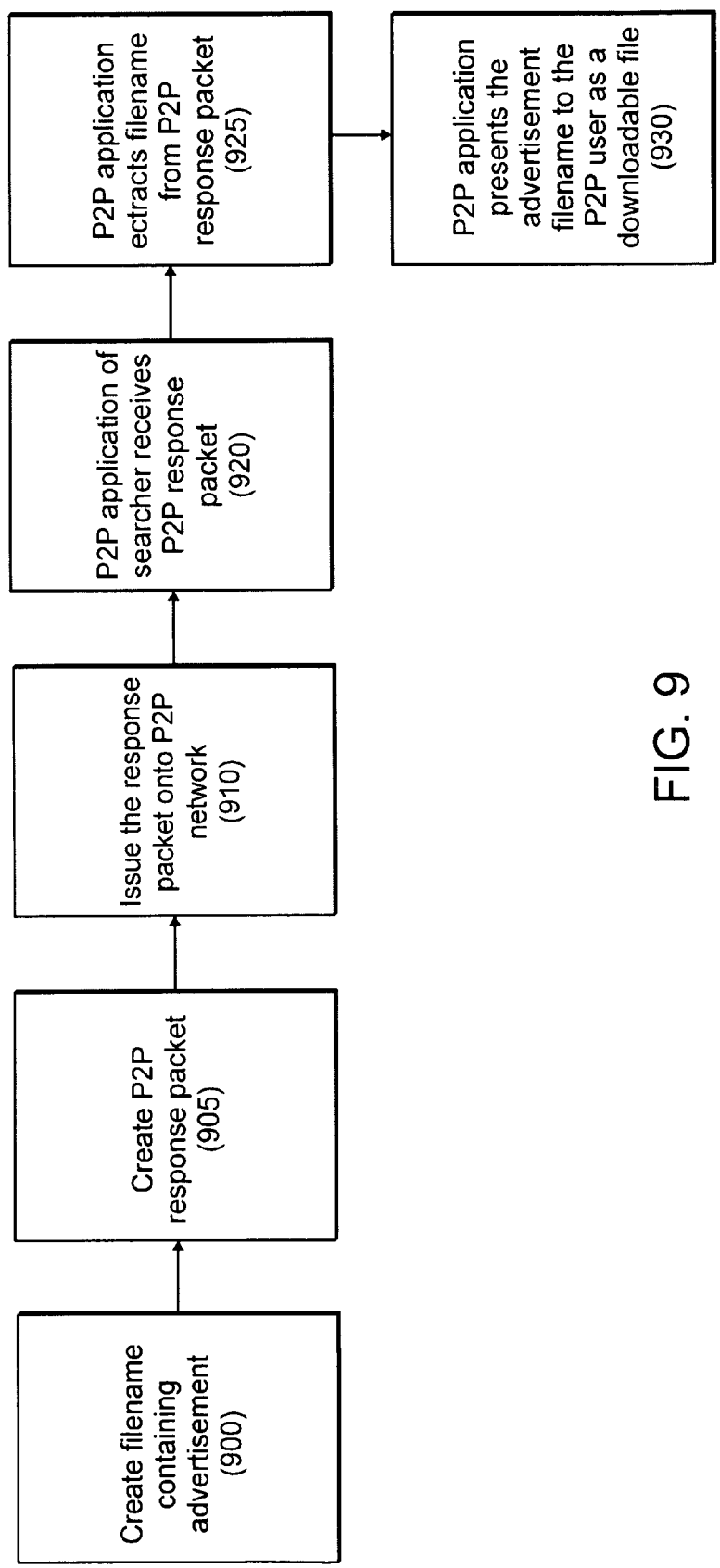
FIG. 9 is an example flow diagram of an example advertisement system advertising to a user.

FIG. 9 is a flow diagram depicting and example embodiment issuing an advertisement to a user in an advertisement system. The advertisement system detects a search has issued and matches keywords that have been identified for searching. An advertisement system creates a filename (905) containing the advertisement information. For example, the filename may be "Singer X.doc." At 910, the advertisement system creates a Peer-to-Peer (P2P) response packet containing the filename created in (905). The advertisement sends the response packet (910) via the P2P network to the P2P user that issued the search. The P2P application, for the user who issued the search, receives (920) the response packet. The P2P application then extracts the filename from the response packet (925) and displays the filename (which is an advertisement) to the user as a downloadable file (930).

Today, organizations and individuals risk disclosing information that should not be shared. To lower this risk, an organization or an individual locates information and identifies what information is private (e.g., should not be disclosed). After identifying what information is private, the organization may take actions to prevent disclosure of the information. One way to prevent the improper information sharing is by monitoring searches made in a network, such as a Peer-to-Peer network, for phrases, terms, or one or more criteria relating to an industry, organization, or company, such as a company name or other nomenclature.

Figure 10:
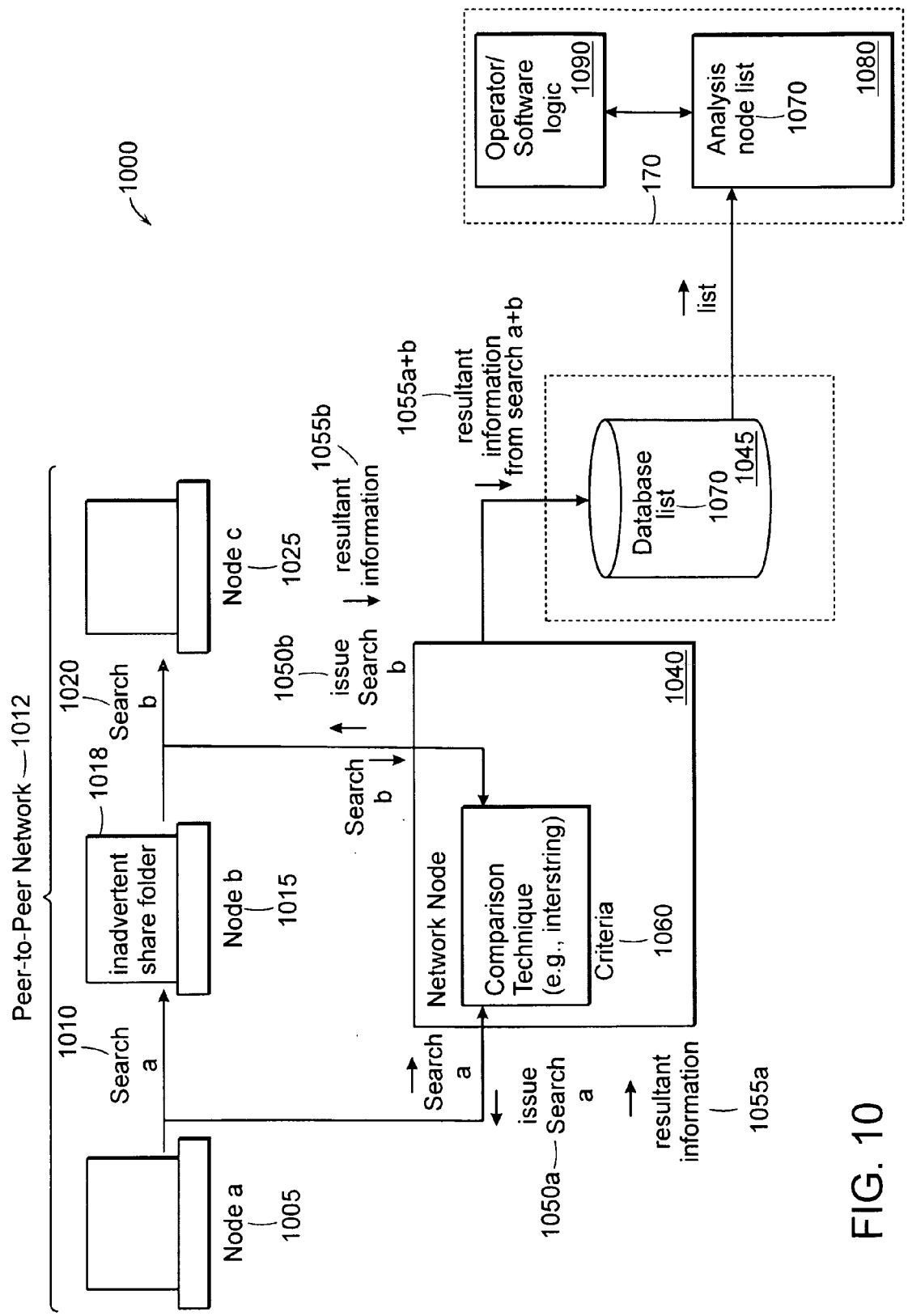
FIG. 10 is an example block diagram depicting a communications network monitoring searches on a Peer-to-Peer network to create a list according to example embodiments of the invention.

FIG. 10 is a block diagram depicting a communications network 1000 monitoring searches 1010, 1020 on a Peer-to-Peer network to create a list according to example embodiments of the invention. In particular, a network node 1040 monitors searches issued on a Peer-to-Peer network 1012. The Peer-to-Peer network 1012 includes node a 1005, node b 1015, and node c 1025, which are in communication with each other. In operation, node a 1005 sends search 1010 to node b 1015. Similarly, node b 1015 sends search b 1020 to node c 1025. For example, node a 1005 and node b 1015 may issue searches 1010, 1020 for the phrase "Acme Bank." Once the search is issued, the network node 1040 obtains the searches 1010, 1020 from the Peer-to-Peer network 1012, typically by obtaining a broadcast message associated with the searches 1010, 1020. After obtaining the searches 1010, 1020, the network node 1040 compares the searches 1010, 1020 to one or more criteria 1060 (e.g., a phrase) using a comparison technique, such as compare. If the one or more criteria 1060 matches the searches 1010, 1020 (e.g., criteria is "AcmeBank"), the network node 1040 updates the one or more criteria 160 to include variations (e.g., "Acme Banks") of the searches 1010, 1020. To do so, the network node 1040 employs pluralization or other algorithms known in the art to determine these additional variations of the searches 1010, 1020.

After updating the criteria 1060, the network node 1040 issues new searches 1050*a-b* based on the updated criteria. As a result, the network node 1040 receives a response from the Peer-to-Peer network 1012 and creates a list of the resultant information 1055*a-b* from the new searches 1050*a-b* and stores the resultant information 1055*a-b* in a database 1045 for analysis.

In a preferred embodiment, the network node 1040 receives a response, including the resultant information 1055*a-b*, from the Peer-to-Peer network 1012. An example resultant information 1055*a* is shown in FIG. 11. In particular, FIG. 11 shows the resultant information 1055*a* as a TCP/IP packet that contains contain a 16 byte descriptor id 1107, a payload descriptor id 1119, a time to live value (normally 3) 1137, a hops value 1142 (normally 0), a payload length 1147, and a payload 1152. The payload typically includes the number of file titles contained in the payload, the TCP/IP port, an IP address, host speed, the result set with a file index, a file size, a file name, and a servent ID number. In an embodiment, the resultant information can also include the name and size of a file, and the IP address of the computer that has the file. It should be understood that a servent is a peer-to-peer network node, which has the features of both a server and a client. Other configurations for the resultant information 1055*a* are also possible.

Referring back now to FIG. 10, an analysis node 1080 may receive the list 1070, which allows an operator or software logic 1090 to identify patterns of searched information in the list 1070. The software logic 1090, for example, determines information, such as a shared folder that contains sensitive or private information, which would be improper to share. That is, the information may be shared inadvertently or by a malicious act or virus. For example, a person may inadvertently shared a dispute letter that contains personal information, such as a credit card number. A user may search for these dispute letters and acquire the credit card number. That is, the user may issue a search and receive a dispute letter, which relates to a credit card purchase for a credit card owner. In the dispute letter, the credit card owner includes the credit card number and/or other personal information. Thus, the user can now view and potentially use the credit card owner's credit card number and/or other personal information.

In other examples, the Peer-to-Peer network 1012 software may have a software bug that permits the sharing of files or information. Likewise, a user's computer may have a virus or worm that connects to the Peer-to-Peer network 1012 and shares information without the user's knowledge, such as inadvertent share folder 1018 in node b 1015. Regardless of the reason for sharing, a user can issue a search including terms that target an organization or individual, such as "Acme Bank dispute letter" or "John Smith credit card." Allowing access to sensitive or private information, via searching, can result in risks to an organization, national security, or other users.

It should be understood that embodiments of the invention are not limited to using a database, such as database 1045, and embodiments of the invention can also store the list in a report, on the network node 1040, or in some other suitable location or memory. Other configurations are also possible.

It should be further understood that other configurations of the Peer-to-Peer network 1012 are also possible. For example, one or more nodes can be classified as main nodes and the other nodes can be classified as leaf nodes. A leaf node connects to main nodes and main nodes can connect to other main nodes. Thus, if a leaf node issues a search request, the leaf node sends the search request to a main node connects to the leaf node. Upon receiving the search request, the main node forwards the request to each leaf node and main nodes connected to the requesting main node. The receiving main node forwards each search request to each of the leaf nodes that they are in connection with. Embodiments of the present invention can also obtain resultant information from leaf nodes searches as well. Moreover, it should be understood that the analysis node 1080 and software logic 1090 are optional components of the communications network 1000 and embodiments can be employed without these components.

FIG. 12 is a block diagram depicting an example search packet 1200 according to example embodiments of the invention. In particular, the search packet 1200 contains a 16 byte descriptor id 1205, a payload descriptor id 1210, a time to live value 1215, a hops value 1220, a payload length of the search term 1225, a search term 1230, and a minimum speed the user accepts 1235. In a preferred embodiment, a network node, such a network node 1040 of FIG. 10, creates a report based on the searches in a search packet 1200. The report can include a listing of all the searches that match criteria including duplicates. Alternatively, the report can include a listing of the search term 1225 that matched the criteria without duplicates. For reports that include duplicates, a number corresponding to the number of searches a particular search term 1225 can be stored. Using the number of searches for a particular search term 1225 can be useful in determining a pattern as described below. In an embodiment, the report can also includes each search term 1225 and a corresponding 16 byte descriptor id 1205.

Figure 13A:
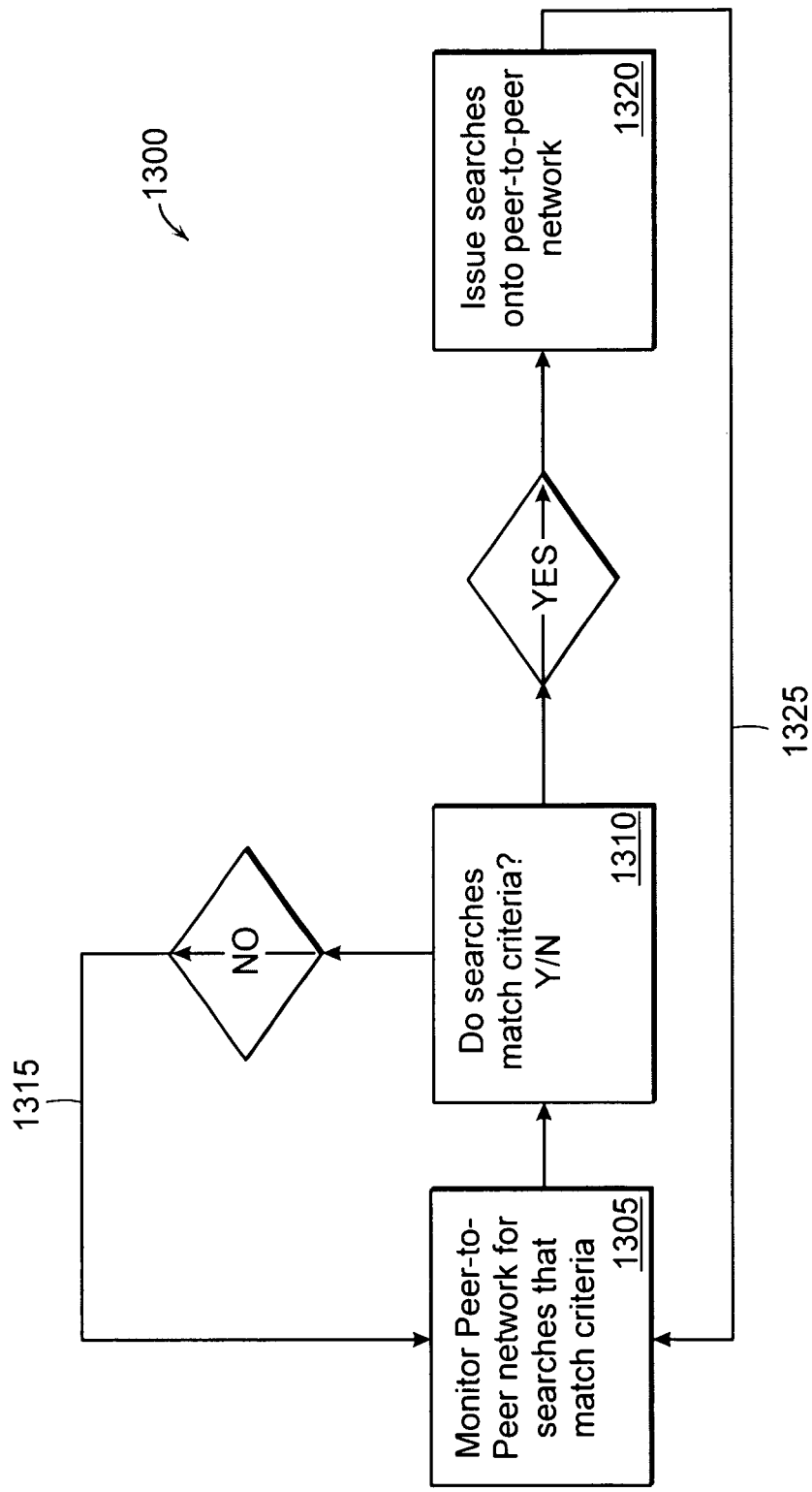
FIG. 13A is an example flow diagram depicting issuing searches on a network according to an example embodiments of the invention.

FIG. 13A is a flow diagram depicting issuing searches on a network according to an example embodiment of the invention. In particular, FIG. 13A shows a process 1300 for monitoring organization information, via monitoring searches, issuing searches, and obtaining a response. The process 1300 monitors a Peer-to-Peer network for searches that match one or more criteria 1305 by using a network node to obtain Peer-to-Peer network broadcast messages. In an preferred embodiment, the process uses comparison techniques, such as compare, a fuzzy logic match, or other comparison technique known in the art, via a programming language, such as C++ or Visual Basic. Using other programming languages or comparison techniques is also possible. In an example embodiment, the programming language considers account punctuation, such as abbreviations, and pluralization to either modify the search term, modify the one or more criteria, or add additional criteria search terms. For example, if a search term is "Acme Banks", the process remove the "s" at the end of "Banks" to expand the results. That is, the process 1300 includes multiple criteria search terms, such as "Acme Bank" and "Acme Banks."

Consider the following example. The process 1300 monitors a network for a search term or phrase (e.g., "Acme Bank") by extracting the search term from a Peer-to-Peer network search packet, such as search packet 1200 of FIG. 12. After extracting the search term, the search term can be compared to criteria using compare, intrastring, fuzzy logic match, or other comparison technique(s). More specifically, the process 1300 determines if the one or more criteria is matched 1310. If there is no match, the process 300 returns to monitoring 1315 for new searches, otherwise the process 1300 continues. More specifically, the process 1300 obtains or receives one or more searches from a Peer-to-Peer network relating to an organization (e.g., "Acme Bank") or individual. The process 1300 compares the one or more searches one or more criteria. The one or more criteria, for example, may be a predefined keyword, set of keywords, or a subset of keywords and may be stored in a database, a computer program, a list, a report, memory, or other suitable storage device.

In an embodiment, an organization or other users defines the one or more criteria with search terms. For example, an organization defines the one or more criteria, which corresponding to an organization, such as a company name, address, brand name(s), name(s) of executive management, addresses, or other representative criteria (or keyword). Example criteria 1350 is shown in FIG. 13B. More specifically, the example criteria 1350 shows search terms issued by suspicious individuals on a network. After issuing the one or more searches, the process 1300 returns to a monitoring phase 1325. The example criteria 1350 is typically a listing of terms or phrases that match the organizations keywords specified by human resources, consumer, agents, or a computer.

In an embodiment, the defining the one or more criteria can be manually entered by the organization or other user. In an embodiment, the process 1300 monitors issued searches and matches the issued searches to existing criteria and adds the searches as additional criteria.

Continuing with FIG. 13A, if the criteria is matched, the process 1300 issues one or more searches onto the Peer-to-Peer network 1320. The process 1300 issues searches by using one of the following: a Peer-to-Peer software application, a non Peer-to-Peer system, or a system that has access to a Peer-to-Peer node for issuing searches. In an embodiment, the searches are issued via a Transmission Control Protocol and an Internet Protocol (TCP/IP) packet.

A TCP/IP packet typically contains a 16 byte descriptor identifier, a payload descriptor identifier of 128, a time to live value (normally 3), a hops value (normally 0), a payload length with the length of the search term, a search term, and a minimum speed a user is accepting.

Figure 14:
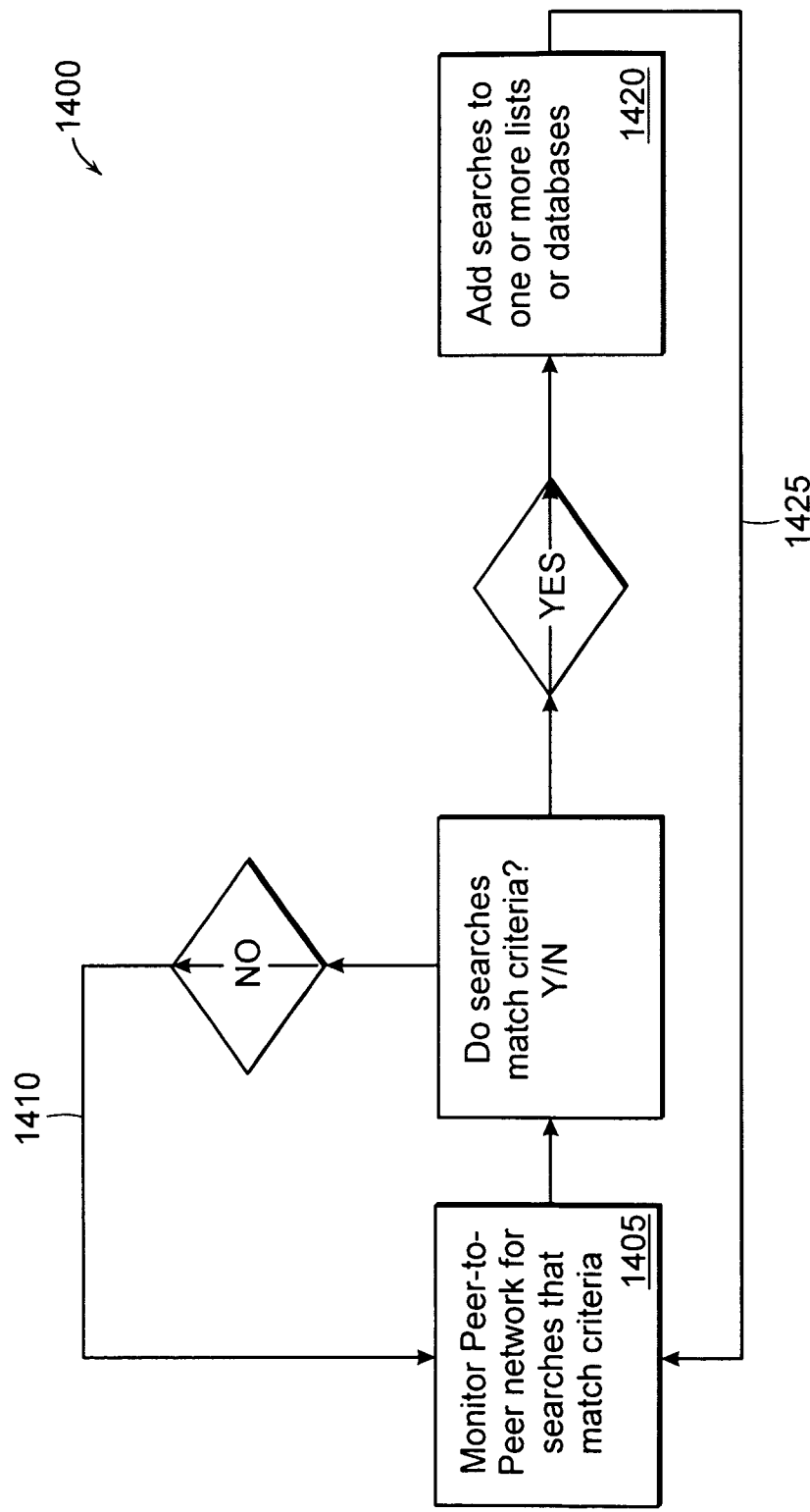
FIG. 14 is an example flow diagram depicting adding searches to a database according to an example embodiments of the invention.

In an embodiment, a process 1400 adds one or more searches to memory as illustrated in FIG. 14. The process 1400 monitors a Peer-to-Peer network for one or more searches that match the one or more criteria 1405. The process 1400 determines if the one or more criteria matches 1410. If there is a match, the process 1400 adds the searches to a list 1420. If the list contains an organization name related to a customer as provided in the criteria, the process 1400 determines that the user may be malicious and targeting their customers. The process 1400 determines such behavior exist by using metrics, such as the number of searches received or the complexity of the search. More specifically, if a user searches for the phrase "Acme Bank Statements," a determination is made that the user is attempting to find bank statement information. The process 1400 adds the record of the searches (and/or the actual searches) to memory 1400 and returns to a monitoring phase 1425 to identify additional searches. If, however, there is no criteria match, the process 1400 returns to a monitoring phase 1410 without adding searches to memory.

Figure 15:
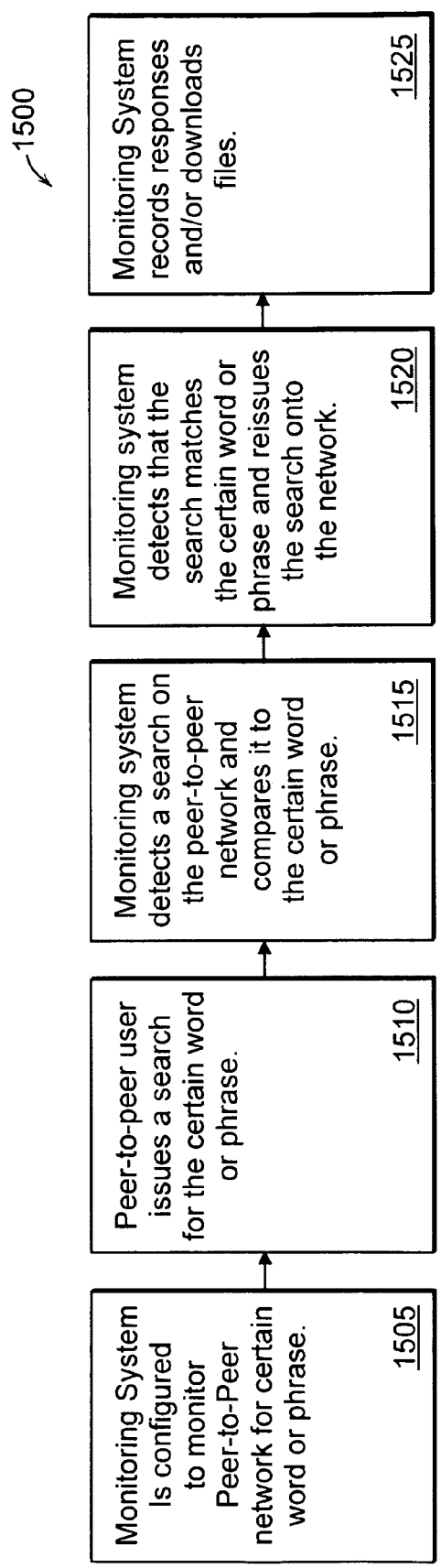
FIG. 15 is an example flow diagram depicting an example monitoring process according to an example embodiments of the invention.

A monitor process 1500 as shown in FIG. 15 allows an organization to protect against unwanted or improper information sharing. In a preferred embodiment, a monitor system in the monitor process 1500 monitors a Peer-to-Peer network and monitors the Peer-to-Peer network for a word or phrase 1505 based on a configuration. In an embodiment, the configuration can be manually entered by an operator of the monitor system or predetermined in some other manner. A Peer-to-Peer user issues a search for the word or phrase 1510. In turn, the monitoring system detects a search on the Peer-to-Peer network and compares the search to the word or phrase 1515. Further, the monitoring system detects that the search matches the certain word or phrase and issues the search onto the network 1520. For example, by monitoring the searches of a "rogue" user, a bank records the search response to identify a rogue user in the future. Thus, the bank is capable of identifying if a potential problem may exist. The monitoring system may record responses to a database and/or download files that match the issued search in computer memory, a database, or on a printed media 1525. In a preferred embodiment, the monitoring system can use TCP/IP to connect to the host and download the file. It should be understood that searches can be issued via TCP/IP packets or other transmission packet.

In an embodiment, the monitoring system issues a "Push" message, which instructs the file host to connect to the monitoring system and upload the file. Thus, the monitoring circumvents any host firewall preventing transfer of the message. A push message can be a TCP/IP packet that would contain a 16 byte descriptor id, a payload descriptor id of 64, a time to live value (normally 3), a hops value (normally 0), Payload length, and a payload. The payload includes a servent identifier, file index, IP address of the Monitoring System, and the TCP/IP port of the Monitoring System.

Figure 16:
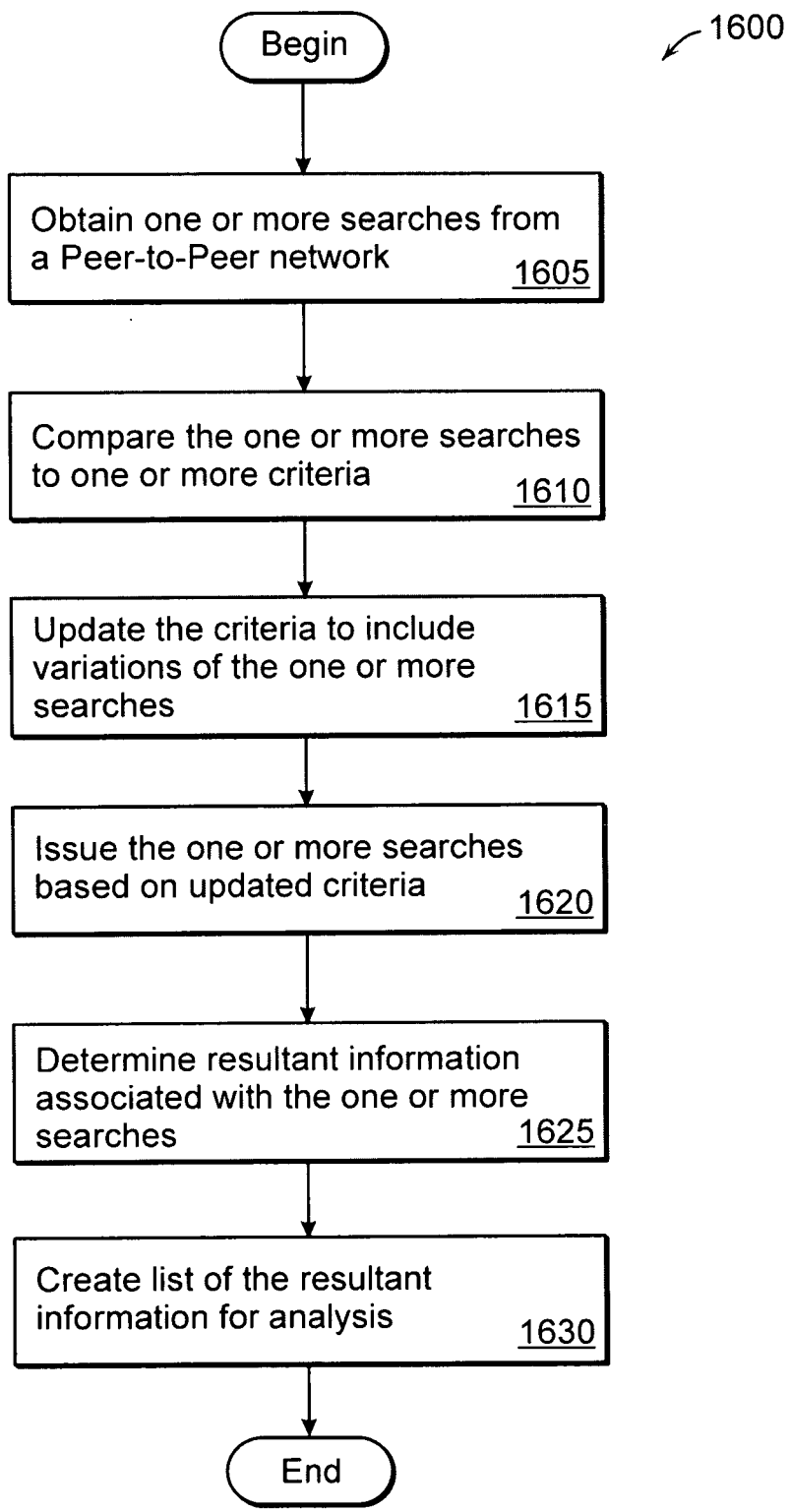
FIG. 16 is an example flow diagram illustrating creating of a list of searched information on a Peer-to-Peer network according to example embodiments of the invention.

FIG. 16 is a flow diagram illustrating creating a list of searched information on a Peer-to-Peer network according to example embodiments of the invention. A process 1600 obtains one or more searches from a Peer-to-Peer network at 1605. At 1610, the process 1600 compares the one or more searches to one or more criteria to determine if there are any matches. At 1615, the process 1600 updates the one or more criteria to include variations or other permutations of the one or more searches. At 1620, the process 1600 issues the one or more searches to the network, based on updated criteria, to obtain resultant information. At 1625, the process 1600 determines the resultant information associated with the one or more searches. At 1630, the process creates a list of the resultant information for analysis.

It should be understood that the resultant information can be in the form of a list, report, a database report, or other suitable presentation. Further, as explained above, software logic can be used to identify patterns in the searched/resultant information based on the one or more criteria. Alternatively, the resultant information can be reviewed by an analyst to identify any patterns/risks. For example, an analyst or software logic identifies a large number of searches relating to personal or business information for a particular executive in an organization in the resultant information. The large number of searches relating to this executive indicates a possible identity theft or other potential risk.

In one embodiment, an Advertising System is a hardware system, such as a computer, thin appliance, ASIC based device or other similar device. The hardware system may be programmed with specific logic or programming code (e.g., software). Further, the hardware system may also be connected to a physical network either directly or via a gateway. Moreover, the hardware system uses programming logic for transmitting and receiving on physical networks and Peer to Peer networks. Programming logic is a software program or other solution including procedural information.

In a convenient embodiment, the advertising system includes a subsystem for connecting to a network, a second system for processing the searches, and a third system for sending the advertisement. For further convenience, the Advertisement System changes its IP address and/or its Peer-to-Peer network identifier to avoid detection on the Internet, appear as more than one node, or as a different node.

It should be understood that any of the processes disclosed herein, such as sending advertisements or the flow diagram of FIG. 8, may be implemented in the form of hardware, firmware, or software. If implemented in software, the software may be processor instructions in any suitable software language and stored on any form of computer readable medium. The processor instructions are loaded and executed by a processor, such as a general purpose or application specific processor, that, in turn, performs the example embodiments disclosed herein.

It should also be understood that an advertisement system may be configured as a single high performance device, one or more devices sharing information and workload, or a group of devices that operate independently. Further, the advertisement system may consist of a network of Peer-to-Peer client nodes configured to advertise and utilize the Peer-to-Peer network to share files. The advertisement system may also contain, programming logic such as software or software embedded in hardware. In an embodiment, the network of Peer-to-Peer nodes can be configured to advertise each shared file, such as video or audio commercials, that matches an advertisement search query. The Peer-to-Peer nodes could also be configured to respond with files that are video or audio commercials that do not match the user's search query, and in effect advertise to each of the user's issuing searches.

While this invention has been particularly shown and described with references to example embodiments thereof, it will be understood by those skilled in the art that various changes in form and details may be made therein without departing from the scope of the invention encompassed by the appended claims.

What is claimed is:

1. A node in a Peer-to-Peer network comprising:
a processor and a memory, the processor configured to:
issue a search request in the Peer-to-Peer network;
receive an advertisement from an advertisement system coupled to the Peer-to-Peer network, where the node receives the advertisement in response to issuing the search request, and where a distance between the node and the advertisement system does not exceed a distance limit of the Peer-to-Peer network indicating a maximum distance limit each message can travel in the Peer-to-Peer network;
receive a different search request from a different node in the Peer-to-Peer network, where the different search request is similar to the search request issued by the node; and
transmit the advertisement to the different node, in response to receiving the different search request, where a distance between the different node and the advertisement system exceeds the distance limit of the Peer-to-Peer network.

2. The node according to claim 1 wherein the advertisement is sent from the advertisement system to the node in response to the search request matching a predetermined criteria.

3. The node according to claim 2 wherein the predetermined criteria is a list of keywords that have been pre-selected to monitor.

4. A node as set forth in claim 1 wherein the advertisement system is coupled to super nodes, ultra Peers, main nodes, or other centralizing node in the Peer-to-Peer network.

5. A method for advertising on a Peer-to-Peer network, comprising:
interposing an Advertisement System on a Peer-to-Peer network;
monitoring the Peer-to-Peer network through the Advertisement System for detecting search requests;
responding to a first node in the Peer-to-Peer network with information that is used for advertising a product or service in response to the Advertisement System detecting a search request that matches a list of predetermined criteria; and
sending, by the first node, the information that is used for advertising the product or service to one or more other nodes in the Peer-to-Peer network, in response to the first node receiving a different search request that is similar to the search request detected by the Advertisement System that matches the list of predetermined criteria, wherein a distance between the first node and the Advertisement System does not exceed a distance limit of the Peer-to-Peer network indicating a maximum distance limit each message can travel in the Peer-to-Peer network and where a distance between the one or more other nodes and the Advertisement System exceeds the distance limit of the Peer-to-Peer network.

6. The method according to claim 5 wherein the distance limit is associated with a number of hops or a time-to-live.

7. The method according to claim 5 further comprising:
storing the information, corresponding to a requested object associated with the search request, at the Advertisement System;
monitoring the Peer-to-Peer network through the Advertisement System for detecting the search request related to the requested object;
acquiring a unique ID generated by the first node in the Peer-to-Peer network requesting the requested object; and
responding to the first node representing the ID requesting the requested stored object with the information that is used for advertising the product or service.

8. The method according to claim 7 wherein the information that is used for advertising the product or service is different from the requested object.

9. A computer readable medium having computer readable program codes, executed by a processor, for advertising on a Peer-to-Peer network, comprising:
detecting a search request for an object from a first node in a Peer-to-Peer network;
preparing, by an advertisement system, an advertisement in response to the search request from the first node, wherein the advertisement is different than the object requested by the first node;
sending, from the advertisement system to the first node, the advertisement over the Peer-to-Peer network, where a distance between the first node and the advertisement system does not exceed a distance limit of the Peer-to-Peer network indicating a maximum distance limit each message can travel in the Peer-to-Peer network; and
sending the advertisement from the first node to the second node in the Peer-to-Peer network upon the first node receiving another search request from the second node that is similar to the search request sent by the first node, where a distance between the second node and the advertisement system exceeds the distance limit.

10. The computer readable medium of claim 9 further comprising:
storing the advertisement corresponding to the object at the advertisement system;
acquiring a unique identification (ID) generated by the first node requesting the object; and
responding with the advertisement to first node representing the ID requesting the object, wherein the advertisement is different from the object.

11. The computer readable medium of claim 9 further comprising comparing the search request to predetermined criteria and retrieving the advertisement to send to the first node in response to the comparison.

12. A method for advertising on a Peer-to-Peer network comprising:
at an advertisement system:
detecting a search request of a first node in a Peer-to-Peer network having a distance limit indicating a maximum distance limit each message can travel in the Peer-to-Peer network,
preparing an advertisement in response to the search request the first node based on a predetermined search criteria, and
sending the advertisement to the first node for the purpose of advertising on the Peer-to-Peer network, wherein the distance between the Advertisement System and the first node is within the distance limit; and
at a second node:
issuing a search that is similar to the search request sent by the first node and detected by the advertisement system, and
receiving the advertisement from the first node in response to the second node issuing the search that is similar to the search request sent by the first node and detected by the advertisement system, the advertisement traveling a distance in the Peer-to-Peer network that exceeds the distance limit in the Peer-to-Peer network.

13. The method according to claim 12 further comprising:
storing an advertisement, corresponding to an object associated with the search request, at the Advertisement System;
monitoring the Peer-to-Peer network via the Advertisement System to detect the search request;
acquiring a unique identification (ID) generated by the first node issuing the search request; and
responding to the first node, representing the ID and requesting the object, with the advertisement that is different than the object.

14. The method according to claim 12 wherein the distance limit is associated with a number of hops or a time-to-live.

15. The method according to claim 12 further including comparing the search request from the first node to predetermined criteria and retrieving the advertisement, by the advertisement system, to send to the first node in response to the comparison.

16. The method according to claim 15 wherein comparing includes comparing the search request from the first node using inter-string, complete string, partial string, fuzzy logic, patricia tree, or any combination thereof.

17. A method for advertising on a Peer-to-Peer network comprising:
at a first node in the peer-to-peer network:
issuing a search request in the Peer-to-Peer network having a distance limit indicating a maximum distance each message can travel in the Peer-to-Peer network,
downloading a file from a second node in the Peer-to-Peer network in response to the first node issuing the search request, wherein the distance between the second node and the first node is within the distance limit of the Peer-to-Peer network, and
receiving an advertisement from the second node in the Peer-to-Peer network in response to the first node issuing the search request, the advertisement traveling a distance in the Peer-to-Peer network that exceeds the distance limit of the Peer-to-Peer network, wherein the second node received the advertisement from an advertisement system that detected a search from the second node that is similar to the search request issued by the first node.

18. The node according to claim 1 wherein a plurality of advertisements sent from the advertisement to nodes in the Peer-to-Peer network are stored in a database coupled to the advertisement system.

* * * * *